United States Patent
Perez et al.

(10) Patent No.: US 11,619,185 B1
(45) Date of Patent: Apr. 4, 2023

(54) HYBRID ELECTRIC VEHICLE WITH A MOTOR COOLING SYSTEM

(71) Applicants: Alberto Martin Perez, Houston, TX (US); Natalia Perez-Lodeiro, Houston, TX (US)

(72) Inventors: Alberto Martin Perez, Houston, TX (US); Natalia Perez-Lodeiro, Houston, TX (US)

(*) Notice: Subject to any disclaimer, the term of this patent is extended or adjusted under 35 U.S.C. 154(b) by 595 days.

(21) Appl. No.: 16/429,030

(22) Filed: Jun. 2, 2019

Related U.S. Application Data

(60) Provisional application No. 62/679,910, filed on Jun. 3, 2018.

(51) Int. Cl.
| | |
|---|---|
| *F02D 35/00* | (2006.01) |
| *B60W 10/06* | (2006.01) |
| *F02D 19/06* | (2006.01) |
| *B60W 10/30* | (2006.01) |
| *B60L 50/10* | (2019.01) |
| *B60W 10/08* | (2006.01) |

(52) U.S. Cl.
CPC .......... *F02D 35/0015* (2013.01); *B60L 50/10* (2019.02); *B60W 10/06* (2013.01); *B60W 10/08* (2013.01); *B60W 10/30* (2013.01); *F02D 19/0602* (2013.01)

(58) Field of Classification Search
CPC ............ F02D 35/0015; F02D 19/0602; B60L 50/10; B60W 10/06; B60W 10/08; B60W 10/30
See application file for complete search history.

(56) References Cited

U.S. PATENT DOCUMENTS

| | | | |
|---|---|---|---|
| 2,460,371 | A | 2/1949 | Szwargulski |
| 6,798,083 | B2 | 9/2004 | Mueller |
| 7,802,614 | B2 | 9/2010 | Elnar |
| 9,291,166 | B2 | 3/2016 | De Larminat |
| 9,410,499 | B2 | 8/2016 | Masubuchi |
| 10,087,896 | B1 | 10/2018 | Perez |
| 10,214,201 | B1 | 2/2019 | Perez |
| 10,221,816 | B2 | 3/2019 | Perez |
| 2005/0151431 | A1 | 7/2005 | Cronin |
| 2007/0119429 | A1* | 5/2007 | Jacquay ............. F16H 57/0415 123/557 |
| 2007/0193717 | A1* | 8/2007 | Turini ................. F02M 21/0221 165/43 |
| 2009/0048745 | A1 | 2/2009 | Wu |
| 2009/0114196 | A1 | 5/2009 | Haugen |
| 2009/0121564 | A1 | 5/2009 | Pal |
| 2009/0194081 | A1 | 8/2009 | Ito |
| 2010/0025006 | A1 | 2/2010 | Zhou |
| 2011/0088657 | A1 | 4/2011 | Tanno |
| 2014/0114515 | A1* | 4/2014 | Porras ................... B60W 20/20 701/22 |
| 2018/0238250 | A1* | 8/2018 | Hosokawa ............. B60W 10/06 |
| 2020/0269659 | A1* | 8/2020 | Norden .................. B60K 6/387 |

* cited by examiner

*Primary Examiner* — Tyler J Lee
*Assistant Examiner* — Yufeng Zhang

(57) ABSTRACT

A Hybrid Electric Vehicle comprising a heat transfer medium, transfers heat generated by an electric motor to a fuel, increasing fuel evaporation and cooling the motor. This configuration allows the use of multiple fuels and fuel blends including hydrogen, liquefied natural gas, natural gas liquids and heavier hydrocarbons in varying proportions while allowing higher efficiency and lower emissions due to the hybrid configuration, and efficient cooling.

17 Claims, 5 Drawing Sheets

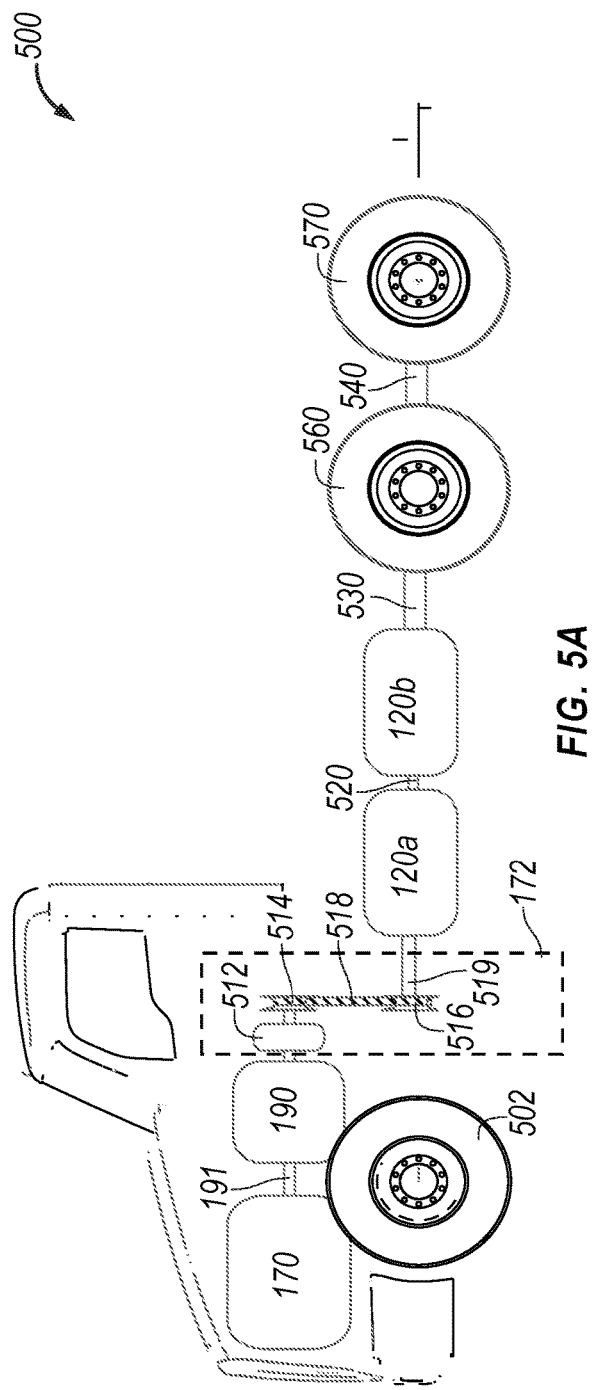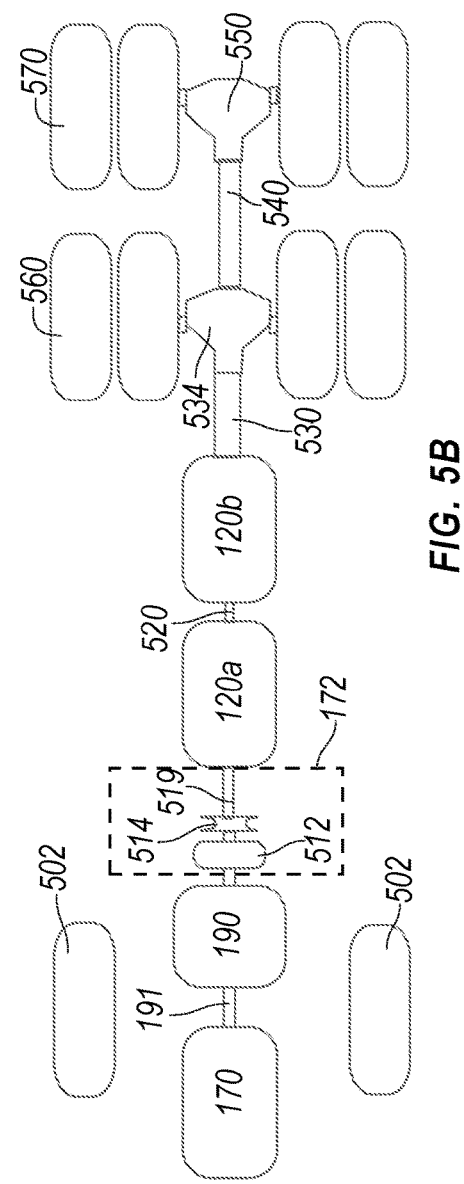
FIG. 5A
FIG. 5B

HYBRID ELECTRIC VEHICLE WITH A MOTOR COOLING SYSTEM

CROSS REFERENCE TO RELATED APPLICATIONS

The present application claims priority to U.S. Provisional Patent Application Ser. No. 62/679,910, filed on Jun. 3, 2018, for "Hybrid Electric Vehicle With Flexible Fuel Propulsion System."

TECHNICAL FIELD

The present invention relates to clean vehicles, hybrid vehicles and flexible fuel hybrid vehicles.

BACKGROUND OF THE INVENTION

The present invention relates to a Flexible Clean Fuel Hybrid Electric Vehicle. The novel configuration allows the vehicle to run efficiently on a plurality of clean fuels of different compositions like hydrogen, renewable natural gas (RNG), liquefied natural gas (LNG), propane, butanes and heavier hydrocarbons.

The configuration of a novel cooling system for an electric motor that uses the fuel as a heat sink contributes to the increased efficiency by pre-heating the fuel and cooling the electric motors synergistically.

Applicant believes that the flexibility, efficiency and lower cost of the current invention will contribute to accelerating the adoption of clean fuel hybrid electric vehicles resulting in significant benefits to the environment and decreasing the dependence on petroleum produced in remote and potentially unstable locations.

The current invention achieves fuel flexibility by adjusting the mass flows of fuel and oxygen utilized to produce energy for the vehicle.

Prior art has approached the issue of vehicles with dual fuel or multiple fuel capabilities. One of the main drivers has been the interest in using gasoline/ethanol blends of varying qualities for environmental reasons.

In recent years, the abundance of natural gas and natural gas liquids like ethane, propane, and butane, has created an economic incentive to use these hydrocarbons as fuel for transport vehicles. There are also substantial environmental advantages in using these fuels as they result in lower carbon, nitrogen oxide, and particulate emissions when compared to diesel and gasoline.

Applicant is not aware of prior art about vehicles that can run cleanly and efficiently on blends of light hydrocarbons (e.g. C1 to C4) and can deal easily and efficiently with significant changes in the proportions of various hydrocarbons within those blends. This flexibility is crucial for market adoption, as the composition of natural gas, renewable natural gas and natural gas liquid blends tends to vary substantially across production methods and regions. When vehicles require tight fuel specifications, as is the norm in today's market, the source fuel must be refined and purified to those tight specifications making the fuel more expensive and logistically difficult to produce and access.

Prior Art on Flexible Fuel Vehicles

A number of patent applications deal with the challenges of maintaining vehicle efficiency and performance under a broad range of engine operation modes while dealing with a variable fuel quality.

US20090114196A1 teaches a flex fuel internal combustion engine system that includes means for sensing ethanol concentration of the fuel. If the ethanol concentration is determined to be above a given threshold, engine operation is adjusted for lean combustion of the fuel. An after treatment system is provided to remove harmful emissions from the exhaust Application US2011/0088657A1 teaches a multi fuel internal combustion engine comprising a throttle valve that is adjusted so that the intake amount of air, which is necessary to achieve an air/fuel ratio according to the operating condition and the combustion mode, is drawn into the combustion chamber.

Application US209/0487.45A1 teaches a flexible fuel, spark ignition, variable boost, hybrid power train having a Supercharger or a turbocharger.

U.S. Pat. No. 9,410,499B2 teaches a control system for a multi-fuel internal combustion engine.

US209/0194081A1 teaches a multi-fuel internal combustion engine.

However, as mentioned above, Applicant has not seen prior art with regard to flexible fuel hybrid vehicles that allow for the adjusting of the operating point of the engine and the air/fuel mix as to operate efficiently using a broad range of fuels, especially if these fuels largely comprise light hydrocarbons (e.g. C1 through C4) or hydrogen.

Prior Art On Cooling Of Electric Motors

Prior art has tackled the issue of cooling electric motors:

Patent application US209/012.1564A1 describes an enhanced motor cooling system.

Patent Application US2005/0151431A1 describes a cooling system for an electric motor.

Patent U.S. Pat. No. 7,802,614B2 (Elnar) relates to motor cooling and in particular to cooling rings rising on an electric spa pump motor case providing cooling for the motor and heat to a spa.

Patent application US2010/0025006A1 (Zhou) teaches a method for managing thermal loads within an electric vehicle using an efficient thermal management system.

U.S. Pat. No. 9,291,166B2 teaches A cooling system provided for a motor powering a compressor in a vapor compression system. The cooling system includes a housing enclosing the motor and a cavity located within the housing. A fluid circuit has a first connection with the housing configured to provide a liquid or two-phase cooling fluid to the motor.

U.S. Pat. No. 2,460,371A teaches a motor cooling means submerged in a liquid fuel. The electric motor, which operates a fuel pump impeller, operates submerged in the fuel tank and with the motor field and armature constantly bathed in the liquid fuel.

U.S. Pat. No. 6,798,083B2 teaches a refrigeration unit being thermally connectable to an electric motor to cool Said motor. Said refrigeration unit includes a tank containing hydrogen or liquid natural gas to provide hydrogen fuel to a fuel cell and to Serve as a System coolant US20090121564A1 teaches a core assembly for an electric motor, includes a heat exchanger comprising a plurality of fins. The fins define a plurality of cooling air passages that include offset fins that disrupt cooling air flow to reduce the formation of boundary layers and improve heat transfer capacity.

However, applicant is not aware of prior art reciting an electric motor cooling system that uses a hydrocarbon or hydrogen fuel of a hybrid electric vehicle as a heat sink for the surplus heat from the motor.

Advantages Over Prior Art

The current invention achieves fuel flexibility by adjusting the mass flows of fuel and oxygen utilized to produce energy for the vehicle. The configuration of a novel cooling system for an electric motor that uses the fuel as a heat sink contributes to the increased efficiency by pre-heating the fuel and cooling the electric motors synergistically.

Applicant believes that the flexibility, efficiency, lower weight and lower cost of the current invention will contribute to accelerating the adoption of clean fuel hybrid electric vehicles resulting in significant benefits to the environment and decreasing the dependence on petroleum produced in remote and potentially unstable locations.

The present invention allows for a vehicle compatible with a broad range of fuels and fuel mixes of varying composition. The operating point of an engine and the flows of fuel and oxygen can be adjusted for optimal efficiency and minimal emissions as the fuel composition varies. The hybrid configuration, comprising electric power storage and an electric motor, provides consistent drivetrain power and torque even when the power output from the engine varies in line with variations in fuel composition, fuel energy density and engine operating point In an embodiment, a cooling loop keeps the temperature of the electric motor low and provides heat to the fuel to ensure enough fuel evaporation to supply the engine. This increases the efficiency of the electric motor and reduces the need for fuel pre heating systems with the consequent weight reduction and efficiency gains.

This cooling approach results in higher motor efficiency by reducing the resistivity of the electric motor windings as the resistivity of most conductors tends to decrease at lower temperatures.

This cooling configuration is especially efficient when using cryogenically cooled fuels like liquefied natural gas (LNG) that require significant pre heating and also provide a very low temperature heat sink for electric motor cooling.

Cooling electric motors is particularly important in electric and hybrid electric vehicles that require the motor and its cooling system to be light and compact. The complexity of the Thermal Management System used in Tesla models illustrates the difficulties inherent to cooling electric motors in vehicles and how prior art solutions involve significant complexity and weight.

Fuel Pre heating also provides an advantage with compressed natural gas (CNG) and liquefied petroleum gas (LPG) fuel systems that require storing the fuel at high pressures. As fuel pressure is brought down for use in the engine, cooling often occurs (e.g. due to Joule Thompson effect) and pre heating can therefore restore the fuel to a temperature adequate for efficient combustion.

Advantages Over Prior Art On Cooling Electric Motors

The invention being disclosed herein provides for an efficient way to remove heat from the motor and avoid a separate cooling system often requiring a compressor/evaporator cycle as Tesla's highly complex Thermal Management System of model's S and X.

This invention also uses the excess heat extracted from the motor to pre heat the fuel and to increase its evaporation rate. This effect is particularly useful when the fuel is a cryogenic liquid such as liquid hydrogen, liquefied natural gas or mixtures of light hydrocarbons stored at temperatures below ambient temperature like ethane, propane or butane or a blend of mixed natural gas liquids. Using heat from the electric motor to help vaporize the cold fuel avoids having to add an external heat exchanger or electric heater to vaporize the fuel.

The synergy between motor cooling and fuel pre-heating results in lower vehicle complexity and weight. This approach also saves energy and increases overall vehicle efficiency.

The present invention also allows for a beneficial feedback loop by which higher power demands from the motor result in incremental heat generated by the motor.

This incremental heat subsequently results in more heat available to pre heat fuel and therefore higher fuel throughput. In an embodiment the extra fuel throughput can then provide an engine with more power to move a generator and ultimately more electric power available to the electric motor.

Conversely, when power demand from the motor is low (e.g. vehicle is parked or cruising), cooling requirements diminish resulting in less fuel pre heating, as while the engine needs less fuel.

These and other objects, features, and advantages will become apparent as reference is made to the following detailed description, preferred embodiments, and examples, given for the purpose of disclosure, and taken in conjunction with the accompanying drawings and appended claims.

SUMMARY OF THE INVENTION

A Flexible Clean Fuel Hybrid Electric Vehicle can run efficiently on a plurality of different fuel compositions comprising hydrocarbons and or hydrogen in varying proportions.

The novel cooling system for an electric motor uses the vehicle's fuel as a heat sink and contributes to increased efficiency by cooling electric motors and pre-heating fuel synergistically.

In an embodiment, the vehicle comprises an engine used to extract chemical energy from a fuel and produce electricity to run one or several electric motors. The electric motors provide torque and power as required to operate the vehicle.

An air to fuel ratio controller (AFRC) automatically adjusts the mass flow of fuel and oxygen into the engine according to the composition of the fuel so as to obtain an optimal operating point resulting in high efficiency and low emissions of pollutants.

In an embodiment, as fuel composition changes, a digital control unit adjusts the operating point of the engine to maximize overall efficiency and reduce emissions for a given fuel composition. This adjustment of the engine's operating point can be done without significantly impacting the power and torque of the vehicle, which is largely determined by electric motors that can also draw energy from an electric energy storage system of the hybrid vehicle.

In an embodiment, an electric energy storage system can be used to store excess energy and provide for temporary power imbalances between the energy demand from the electric motors and the power produced by the engine.

In an embodiment the electric energy storage system comprises a battery. In an embodiment the electric power storage system can comprise a combination of batteries, capacitors, ultra capacitors, flywheels, fuel cells and other energy storage means.

Several advantages can be obtained from this invention as disclosed, including the ability to run the engine efficiently on a broad diversity of fuels and fuel blends ranging from blends of hydrogen, liquid methane and natural gas liquids to longer chain hydrocarbon mixtures. The present invention also allows for efficient cooling of the electric motor resulting in lower motor winding losses.

BRIEF DESCRIPTION OF THE DRAWINGS

FIG. 5A illustrates the side view an embodiment of the Flexible Clean Fuel Hybrid Vehicle for a heavy-duty vehicle.

FIG. 5B illustrates the top view of an embodiment of the Flexible Clean Fuel Hybrid Vehicle for a heavy-duty vehicle.

DETAILED DESCRIPTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

Therefore, the scope of the present invention is defined only by the appended claims, along with the full scope of equivalents to which such claims are entitled.

Figure 1:
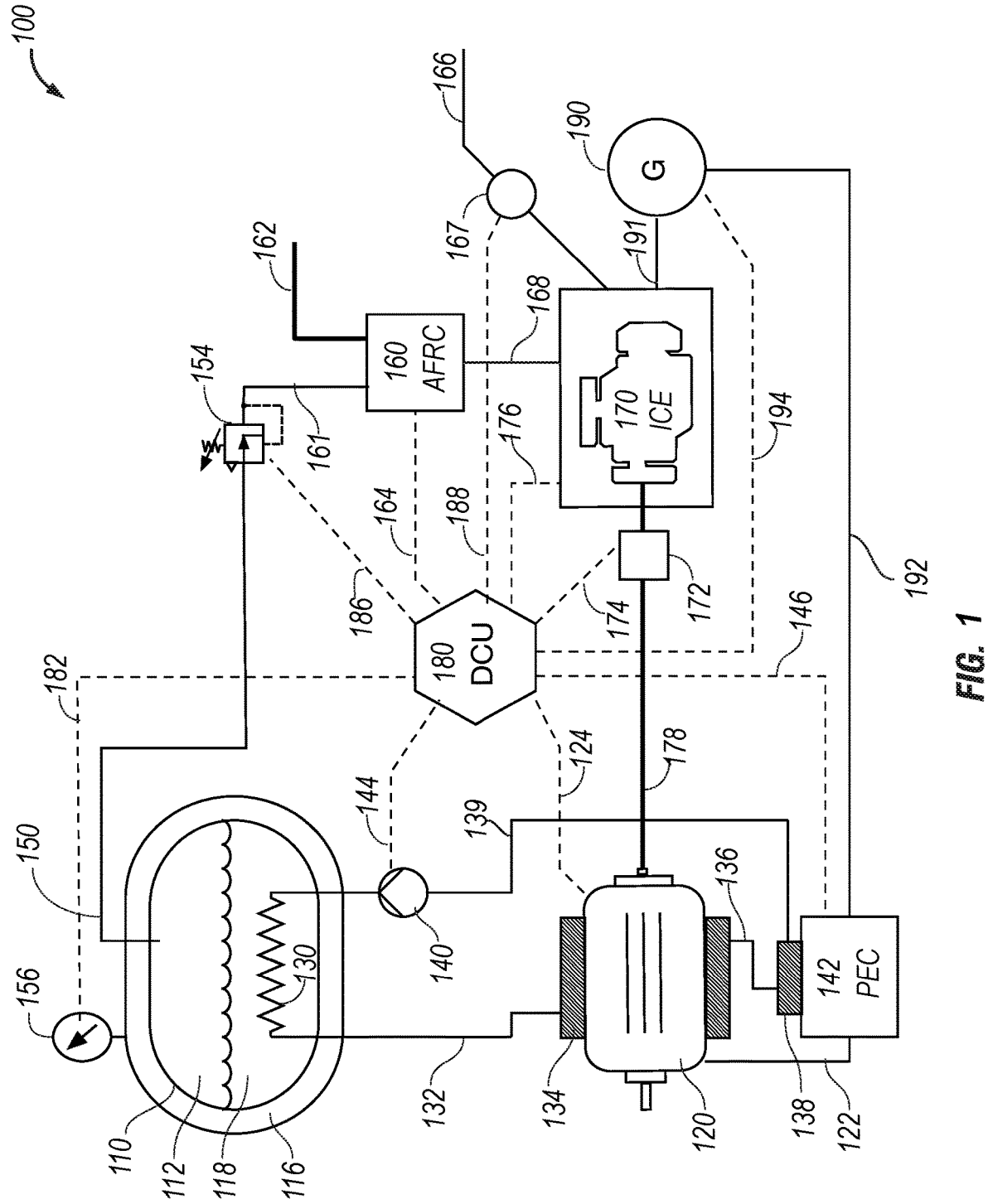
FIG. 1 shows an embodiment of a Flexible Clean Fuel Hybrid Electric Vehicle comprising a motor cooling circuit.

A Flexible Fuel Hybrid Electric Vehicle 100 according to an embodiment of the present invention is illustrated in FIG. 1.

Engine and Fuel System FIG. 1

For the purpose of the present specification, the term "engine" will be used in reference to a device that uses chemical energy from a fuel to produce kinetic or electric energy for the use of the vehicle. This "engine" will usually oxidize the fuel with oxygen primarily obtained from atmospheric air or an oxidizing agent stored in the vehicle. Fuel cells, reciprocating engines, Wankel engines, gas turbines and Stirling engines are encompassed by the term "engine" as used in the present document.

In an embodiment 100, a fuel 118 is stored in fluid state within a fuel tank 110 and provides chemical energy to an engine 170. The engine (ICE) 170 converts chemical engine from the fuel into kinetic or electric energy to power an electric motor 120 of the Flexible Fuel Hybrid Electric Vehicle.

In an embodiment, the engine 170 is selected from the group comprising fuel cells, reciprocating engines, Wankel engines, gas turbines and Stirling engines.

In an embodiment, the engine 170 receives a mix comprising fuel and oxygen through an intake manifold 168. The oxygen and fuel react chemically producing electrical or kinetic energy along with residual chemical compounds resulting from the chemical reactions comprising the oxygen and the fuel.

In an embodiment, the residual chemical compounds exit the engine through an exhaust 166.

In an embodiment, the fuel inside the tank 110 has a liquid phase 118 and a gaseous phase wherein the gaseous phase is within a fuel vapor space 112 inside the tank 110. In another embodiment, the fuel comprises only a gaseous phase.

The engine (ICE) 170 can be an internal combustion engine such a reciprocating engine (e.g. diesel engine, spark plug engine, Otto cycle engine, Atkinson engine), Wankel engine, or gas turbine; a Stirling engine or other suitable type of engine.

In an embodiment, the engine 170 is a spark plug reciprocating engine.

In an embodiment, the engine 170 propels a generator 190 by providing mechanical energy to the generator 190 through a generator shaft 191.

In an embodiment, the engine and generator are replaced by a fuel cell and the fuel comprises predominantly hydrogen.

The engine 170 consumes a fuel 118 selected from the group of hydrogen, hydrocarbons and mixtures thereof originating in a fuel tank 110.

A fuel path delivers fuel from the fuel tank 110 to the engine 170. The fuel path comprises a first fuel line 150, a pressure regulator 154 and a second fuel line 161 that delivers fuel to the engine (ICE) 170 through an air to fuel ratio controller AFRC (160).

The pressure regulator 154, controls the pressure of the fuel in the second fuel line allowing for pressure variations inside the fuel tank 110. In an embodiment the pressure regulator 154 comprises a shut off valve that can cut the flow of fuel from the fuel tank 110 to the engine 170. In an embodiment the pressure regulator 154 can be controlled electronically.

The air to fuel ratio controller (AFRC) 160 automatically adjusts the mass flow of fuel and oxygen into the engine according to the composition of the fuel so as to obtain an optimal operating point resulting in high efficiency and low emissions of pollutants.

In an embodiment, the air to fuel ratio controller (AFRC) 160 comprises an air intake 162 and obtains oxygen from atmospheric air entering the AFRC 160 through the air intake.

The fuel tank 110 is filled through a fueling system (not drawn).

In an embodiment the first fuel line 150 connects a fuel vapor space 112 containing fuel vapor within the fuel tank 110 to an inlet of the pressure regulator 154 and an outlet of the pressure regulator connects to a fuel inlet of the air to fuel ratio controller (AFRC) 160 through the second fuel line 161.

In an embodiment, the fuel flowing through the first fuel line 150 and through the AFRC 160 into the engine 170 is in gaseous or vapor phase. In another embodiment, the fuel flowing through the first fuel line 150 and through the AFRC into the engine is primarily in liquid phase.

Figure 4:
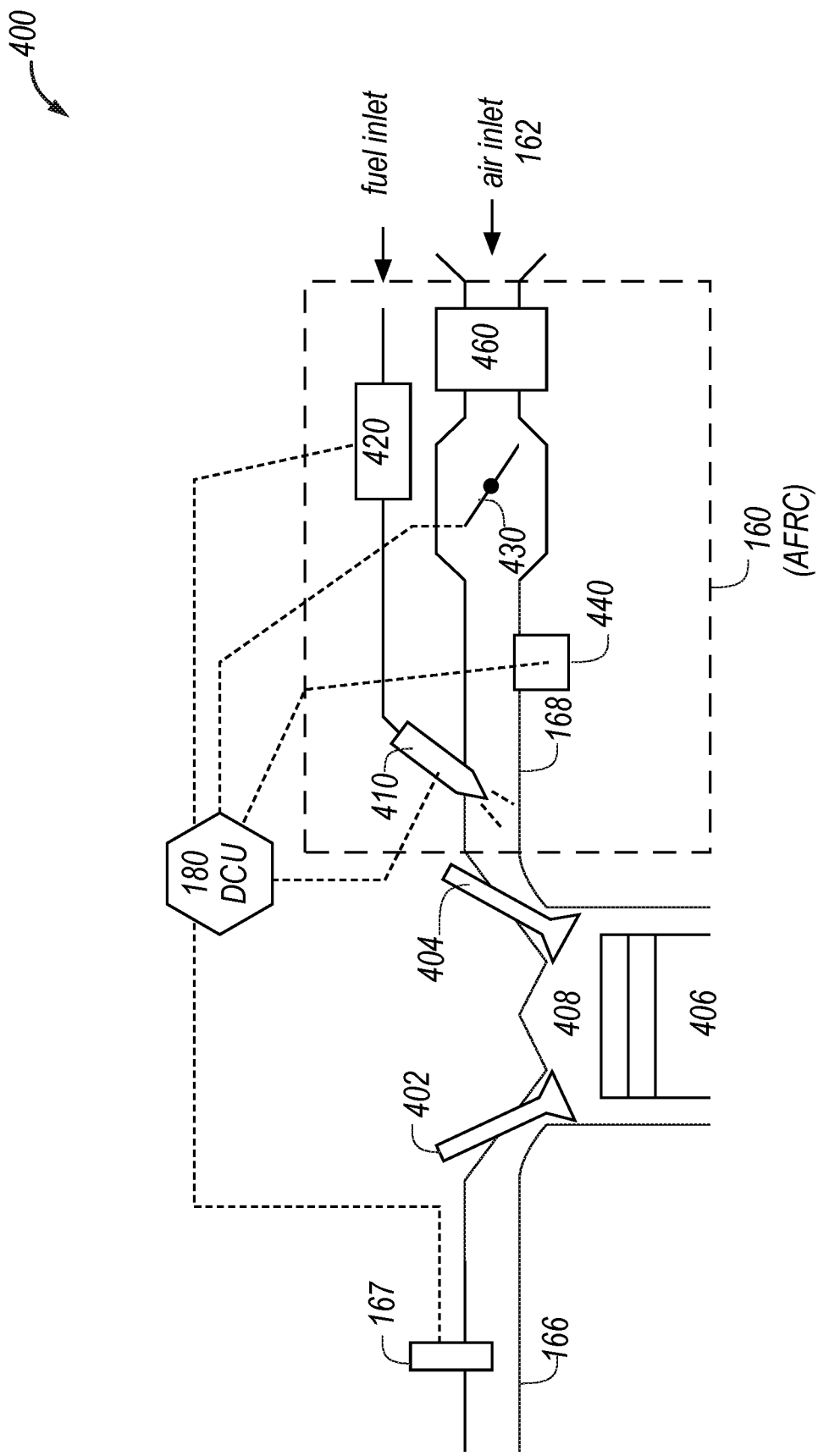
FIG. 4 illustrates an embodiment of the air to fuel ratio controller AFRC 160 of FIG. 1.

An embodiment of the air to fuel ratio controller 160 (AFRC) is presented on FIG. 4.

In an embodiment the fuel tank 110 contains a liquid fuel 118 comprising hydrogen and or hydrocarbons selected from the group comprising methane (C1), ethane (C2), propane (C3), butane (C4), isobutene (C4), heavier hydrocarbons (C5+) and mixtures thereof at a pressure and temperature consistent with the fuel components remaining in a liquid phase inside the fuel tank 110.

In an embodiment, the liquid fuel comprises liquefied natural gas or LNG stored at a temperature equal to the boiling point of methane (−161 degrees Celsius at atmospheric pressure or below −150 Celsius consistent with the boiling point of methane at a higher pressure).

In an embodiment, the fuel is hydrogen stored at a pressure higher than 300 bar and temperature lower than 70 degrees Kelvin.

In an embodiment, the fuel is stored within the fuel tank 110 at a temperature range between 33 degrees Kelvin and ambient temperature, and at a pressure range between 1 bar and 1000 bar.

In an embodiment, the liquid fuel is LNG and is stored at −161 degrees Celsius and a pressure between 14 and 200 PSI.

The fuel tank 110 may be constructed in any suitable shape and/or thickness for a vehicle application. The material, shape and thickness of the tank must withstand the temperatures and pressures of the fuel. For example, the shape of the fuel tank 110 may be spherical, cylindrical with hemispherical ends, toroid or any other shape suitable for relatively high pressures. Further, the fuel tank 110 must satisfy U.S. Department of Transportation (DOT) requirements. In an embodiment, the fuel tank 110 is a cylinder with hemispherical ends.

In an embodiment, the fuel tank 110 is covered by thermal insulation 116. The thermal insulation helps keep the fuel colder than ambient temperature and prevents ambient heat from leaking into the fuel tank.

In an embodiment, the fuel tank 110 can be a vacuum insulated double wall Dewar tank suitable for storing liquids at cryogenic temperatures.

In an embodiment, the insulation 116 comprises a radiant barrier comprised of a plurality of layers of reflective material configured to avoid radiation, a thickness of low thermal conductivity material configured to reduce thermal conduction, and a vacuum chamber configured to reduce heat transfer from convection. In an embodiment, the low thermal conductivity material is selected from the group of fiberglass, Aerogel®, supercritical dried gels, perlite, polystyrenes, Styrofoam®, organic fibers, synthetic fibers and combinations thereof.

Air to Fuel Ratio Controller 160

In an embodiment, an air to fuel ratio controller (AFRC) 160 comprises a fuel inlet connected to the second fuel line 161, an air inlet 162 open to the atmosphere, and an air fuel mix outlet connected to an intake manifold 168 of the engine 170.

The AFRC 160 combines air from the air inlet 162 and fuel from the fuel inlet into an air fuel mix of predetermined air to fuel ratios. The air fuel mix flows through the air fuel mix outlet into the intake manifold 168 of the engine 170 (the intake manifold represented in FIG. 1 as a single line for drawing clarity) such that the fuel mix originating from the fuel tank can be burned completely through a stoichiometric, lean or rich burn process by adjusting the proportions of air and fuel of the air fuel mix.

In an embodiment (not drawn), the AFRC 160 comprises a carburetor connected to the fuel inlet, a butterfly valve connected to the air inlet wherein the butterfly valve regulates the airflow into the carburetor and a pressure regulator valve that regulates the fuel pressure into the inlet of a Venturi nozzle in the carburetor.

In an embodiment 100, the air fuel mix outlet of the AFRC 160 connects to the intake manifold 168 of engine 170.

In an embodiment, the intake manifold 168 comprises a plenum and a plurality of runners, each runner connected to an intake port of the engine 170. For simplicity the intake manifold is represented schematically in FIG. 1 as a single line 168.

The air to fuel ratio controller 160 (AFRC) allows for adjusting the proportion of air into the air to fuel mix that goes into the engine 170 through the intake manifold 168.

In an embodiment, an exhaust sensor 167 is connected to an exhaust 166 of the engine 170. The exhaust sensor 167 monitors exhaust gases and enables a closed loop control system of the AFRC 160 that allows the air proportion of the air fuel mix to be adjusted so as to control the amount of exhaust pollutants produced by the engine such as carbon monoxide, nitrogen oxides and other contaminants.

An embodiment of the air to fuel ratio controller 160 is disclosed in FIG. 4. as an example.

In an embodiment, the AFRC 160 comprises a plurality of fuel injectors, each of them attached to one of the runners in the intake manifold 168 so that the amount of fuel injected into each of the runners can be accurately controlled to efficiently obtain the desired type of combustion or oxidation process in the engine (e.g. selected from the group comprising lean burn, stoichiometric burn, and rich burn).

In an embodiment, the AFRC 160 is configured to operate in conjunction with the fuel injection system of the engine 170 so as to maintain a desired fuel to air ratio for adjusted to the specific composition of the fuel.

In an embodiment, the air to fuel ratio is determined according to table 1 below within a plus or minus 20% tolerance.

TABLE 1

Air To Fuel Volume Ratios For Certain Hydrocarbons in an Embodiment.

| Fuel | Air to fuel ratio |
| --- | --- |
| Natural gas/methane | 10:1 |
| Propane | 25:1 |
| Butane | 32:1 |

In the event of a mixture of the fuels provided in table 1, the air to fuel volume ratios are adjusted to provided the desired type of combustion of the fuel mix (e.g. lean burn, rich burn or stoichiometric).

In an embodiment, the AFRC 160 can be configured to provide a lean air to fuel mixture with an amount of air exceeding what would be required for a stoichiometric mix.

In an embodiment, the AFRC 160 can be configured to maintain a rich mix with less air than what is needed for stoichiometric combustion.

In an embodiment, the AFRC 160 adjusts the duration of fuel injection pulses along with the airflow through an air inlet 162 to achieve predetermined air to fuel ratios for each specific fuel composition.

In an embodiment, the AFRC 160 is controlled by a digital control unit DCU 180 through a series of interfaces, communication links, and control signals that can be digital or analog as shown in FIG. 1. The communication link 164 represents a series of physical or wireless connections and interfaces that allow control signals to flow from the DCU 180 to the AFRC 160 and data signals to flow from the AFRC to the DCU.

In an embodiment, the AFRC comprises a series of sensors connected to the DCU that enable a closed loop control system of the AFRC 160 by the DCU 180.

In an embodiment, the AFRC 160 comprises a combination of sensors selected from the group including an air flow sensor, air mass meters, lambda closed loop controls, oxygen sensors, flywheel speed sensors, engine camshaft position sensors, air throttle angle sensors, smoke sensors, gas mass flow sensors and combinations thereof.

In another embodiment, the engine (ICE) 170 can use single port or multi port injection that delivers fuel into a plurality of runners of an intake manifold through a plurality of fuel injectors. The AFCR 160 controls the amount of fuel supplied by the injectors, the timing and duration of fuel pulses, and the amount of air flowing into the intake manifold 168 to achieve a predetermined air to fuel ratio for each specific fuel composition and desired type of combustion.

Electric Systems

The propulsion system of the flexible fuel hybrid vehicle comprises an electric motor or a plurality of electric motors arranged in a variety of configurations.

For illustration purposes FIG. 1 depicts a single electric motor 120. FIG. 5 illustrates an embodiment with two motors with their shafts connected by a solid coupling.

However, these embodiments should not be considered as a limitation. Going forward any reference to an electric motor should be understood as either a single or multiple electric motors configured to provide propulsion to the hybrid vehicle.

The electric motor 120 drives the vehicle's power train (not drawn in FIG. 1).

A power electronics converter (PEC) 142 has a plurality of input terminals electrically connected to a first power line 192 comprising a plurality of electric conductors. The first power line 192 connects the PEC 142 to the generator 190 so that power from the generator 190 can flow to the PEC 142.

The power electronics converter (PEC) 142 provides energy to the electric motor 120 through a second power line 122 electrically connected to the electric motor 120. The PEC 142 applies a predetermined pattern of currents and voltages to the electric motor through the second power line and determines the rotational speed and torque of the electric motor 120.

In an embodiment with a plurality of electric motors, there would be a plurality of power electronic converters 142 with each electric motor being controlled by a separate power electronics converter.

In an embodiment, the power electronics converter (PEC) 142 comprises electronic circuits and electric energy storage and obtains power from a generator 190 through the first power line 192.

In an embodiment, the PEC 142 can be configured to receive electric power from an external source to charge the electric energy storage enabling the hybrid vehicle to operate as a plug-in hybrid.

The electric motor 120 can be any kind of device or plurality of devices that convert electricity into rotating power and torque. In an embodiment, the electric motor is selected from the group comprising induction AC motors, synchronous AC motors, reluctance AC motors, brushed direct current motors, brushless direct current motors and combinations thereof.

In an embodiment, the electric motor is a three-phase AC induction motor.

In another embodiment, the electric motor comprises two three phase AC induction motors connected in tandem.

In another embodiment, the electric motor comprises four AC induction motors, each of one connected to a traction wheel of the vehicle.

In another embodiment, the electric motor comprises two series direct current motors.

In an embodiment, a generator 190 converts rotating mechanical energy and torque from the engine into electricity. The generator is mechanically connected to the engine by generator shaft 191.

In an embodiment, the generator is selected from the group comprising induction AC generators, synchronous AC motors, reluctance AC motors, brushed direct current motors and brushless direct current motors and combinations thereof.

In an embodiment, the generator is a permanent magnet synchronous three-phase AC generator.

The power electronics converter 142 comprises electronic circuits, trigger circuits, passive components, sensors, capacitors, semiconductor switches, and energy storage units, that allow the powering and control of the electric motor as required by the vehicle's driving conditions.

The power electronics converter is configured to receive power from the generator through a first power line 192 and comprises an electric energy storage unit (340) that allows for the temporary storage of power allowing the power used by the electric motor to be differ from the power generated by the generator over a predetermined period of time.

Mechanical Coupling

In an embodiment, a mechanical coupling 172 is provided to allow the incremental transmission of power and torque from the engine (ICE) 170 directly to the electric motor shaft through a motor driveshaft 178. In an embodiment, a digital control unit 180 controls the engagement of the mechanical coupling 172.

In an embodiment, the mechanical coupling 172 between the electric motor and the engine may include a transmission, transaxle, torque converter, clutch, chain drives, v-belts, timing belts, sprockets or other mechanical devices such that the electric motor and engine can rotate at different speeds while mechanically linked and conveying power and torque to a drivetrain of the hybrid vehicle.

In an embodiment, the mechanical coupling 172 comprises a clutch that can be disengaged to decouple the ICE and the motor so that the hybrid vehicle can fully operate as a series hybrid vehicle with all the energy flowing to the drive train being provided by the electrical system.

In an embodiment, the mechanical coupling 172 comprises a torque converter that enables the transmission of torque without requiring the ICE and the motor to operate at the same rotational speed.

In an embodiment the mechanical coupling 172 comprises a transmission that can provide a plurality of gearing ratios or a continuously variable transmission (CVT).

In an embodiment, the torque converter comprises a fluid torque converter.

In an embodiment, the mechanical coupling 172 comprises a torque converter and a clutch so that the ICE and the motor can be either completely decoupled when the clutch is disengaged (series hybrid operation) or linked through the torque converter when the clutch is engaged (parallel hybrid operation).

Electric Motor Cooling System

In an embodiment, the electric motor 120 and power electronics converter 142 are cooled by means of a first cooling circuit that circulates a first coolant fluid in thermal contact with the electric motor 120 and power electronics converter 142 and takes the first coolant fluid through a fuel heat exchanger 130 inside the fuel tank 110 so that excess heat can be transferred from the motor 120 and Power Electronics Converter 142 into the first coolant fluid and from the first coolant fluid into the fuel 118 within the fuel tank 110.

In an embodiment, the fuel 118 comprises liquid methane stored at a temperature below minus 150 degrees Celsius providing for a highly efficient cooling system.

The motor cooling system comprises a first coolant fluid. In an embodiment the first coolant fluid is selected from the group comprising nitrogen, ethane, ethylene glycol and water solutions, propylene glycol and water solutions, water, de ionized water, poly alpha olefins and mixtures thereof.

To prevent the first coolant fluid from freezing inside the fuel heat exchanger 130 while the vehicle is idle, an electric resistance (not drawn) can be located inside the fuel heat exchanger 130 to melt the frozen coolant inside the fuel heat exchanger 130 if necessary prior to starting the electric motor cooling system.

The first motor cooling chamber 134 is filled with the first coolant fluid in thermal contact with the electric motor.

A first coolant line 132 takes the first coolant fluid from the fuel heat exchanger 130 inside the fuel tank 110 to the first motor cooling chamber 134.

A second coolant line 139 takes the first coolant fluid from an outlet of the first motor cooling chamber 134 to the inlet of a coolant pump 140.

The coolant pump 140 controls the flow of first coolant fluid into the fuel heat exchanger 130.

A third coolant line takes the first coolant fluid from the coolant pump 140 to the fuel heat exchanger 130 completing the first cooling circuit.

In an embodiment, a PEC coolant chamber 138 in thermal contact with the PEC 142 is inserted between the first motor cooling chamber and the coolant pump connecting to the first motor cooling chamber through a PEC coolant line 136.

Digital Control Unit 180

In an embodiment, a digital control unit (DCU) 180 controls the operation of the hybrid vehicle and its components.

The DCU 180 comprises a plurality of processors capable of executing predetermined machine instructions; memory that can store data and computer code; data storage; a data bus, a power supply and adequate interfaces to control peripherals and communicate with external devices through various communication links.

The DCU 180 may include a variety of computer-readable media. Computer readable media can be any available media that can be accessed by the DCU 180 and includes both volatile and nonvolatile media, removable and non-removable media. By way of example, and not limitation, computer-readable media may comprise computer storage media and communication media. The computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the DCU 180.

The memory (not shown) may include computer-storage media in the form of volatile and/or nonvolatile memory. The memory may be removable, non-removable, or a combination thereof. Suitable hardware devices include solid-state memory, hard drives, optical-disc drives, etc. The DCU 180 includes a processor (not shown) that reads data from various entities such as the memory or the I/O components discussed below.

The DCU 180 receives digital and analog signals from sensors located in various components of the hybrid vehicle through respective communication links and sends digital and analog signals to control various elements of the hybrid vehicle through the respective communication links as illustrated with dotted lines on FIG. 1.

In the context of this application, the terms "communication link", "data link" and "data control link" refer to any interface, physical or wireless that connects two or more devices and can be configured to transfer information between those devices. This information can be transferred digitally or through analog signals (e.g. voltage levels). Communication links are represented by dotted lines in the drawings.

A pressure sensor 156 measures and monitors the pressure inside the fuel tank 110 and sends digital or analog signals corresponding to pressure through a communication link 182 to a digital control unit (DCU) 180.

In an embodiment, the DCU 180 sends and receives signals that can comprise:
- analog or digital signals corresponding to fuel tank pressure from/to the pressure sensor 156 through a first communication link 182.
- analog or digital signals from/to a solenoid valve through corresponding to the status of the solenoid valve.
- analog or digital signals from/to the pressure regulator 154 through a second communication link 186 corresponding to the status of the pressure regulator.
- analog or digital signals from/to the AFCR 160 through a third communication link 164 corresponding to parameters comprising air mass flow, fuel mass flow, position of an air throttle valve, and status of each fuel injector;
- analog or digital signals from/to the exhaust sensor 167 through a fourth communication link 188 corresponding to parameters comprising the composition of exhaust gases including oxygen;
- Analog or digital signals from/to the engine 170 through a fifth communication link 176 corresponding to parameters comprising flywheel speed, camshaft position and temperature
- Analog or digital signals from/to the mechanical coupling 172 through communication link 174 corresponding to parameters comprising the status of the coupling and the rpm speed on the ICE side and the electric motor side of the coupling;
- Analog or digital signals from/to the generator 190 through a sixth communication link 194 corresponding to parameters comprising current, voltage and rpm;
- Analog or digital signals from/to the power electronics converter (PEC) 142 through a seventh communication link 146 corresponding to parameters comprising input currents and voltages into the PEC and output currents and voltages out of the PEC;

Analog or digital signals from/to the coolant pump 140 through an eighth communication link 144.

Analog or digital signals from/to the motor 120 through communication link 124 corresponding to winding temperature, rpm, currents and voltages into the motor.

In an embodiment, the DCU 180 sends signals that can comprise:

Analog or digital control signals to the solenoid valve 152 through the communication link 184 to command the opening and closing of the valve;

Analog or digital control signals to the pressure regulator 154 through the communication link 186 to command the opening and closing of the valve and adjust the pressure downstream of the valve;

Analog or digital control signals to the AFRC 160 through the communication link 164 to command the air to fuel ratio;

Analog or digital control signals to the engine 170 through the communication link 176 to command the throttle and control the rotational speed of the engine;

Analog or digital control signals to the generator 190 through the communication link 194 to command the generator;

Analog or digital control signals to the mechanical coupling 172 through the communication link 164 to command the air to fuel ratio;

Analog or digital signals to the power electronics converter (PEC) 142 through the communication link 146 corresponding to trigger pulses and control signals.

Analog or digital control signals to the electric motor 120 through the communication link 124 to command motor operating parameters;

Analog or digital control signals to the pump 140 through the communication link 144 to command the timing and speed of the pump.

Figure 2:
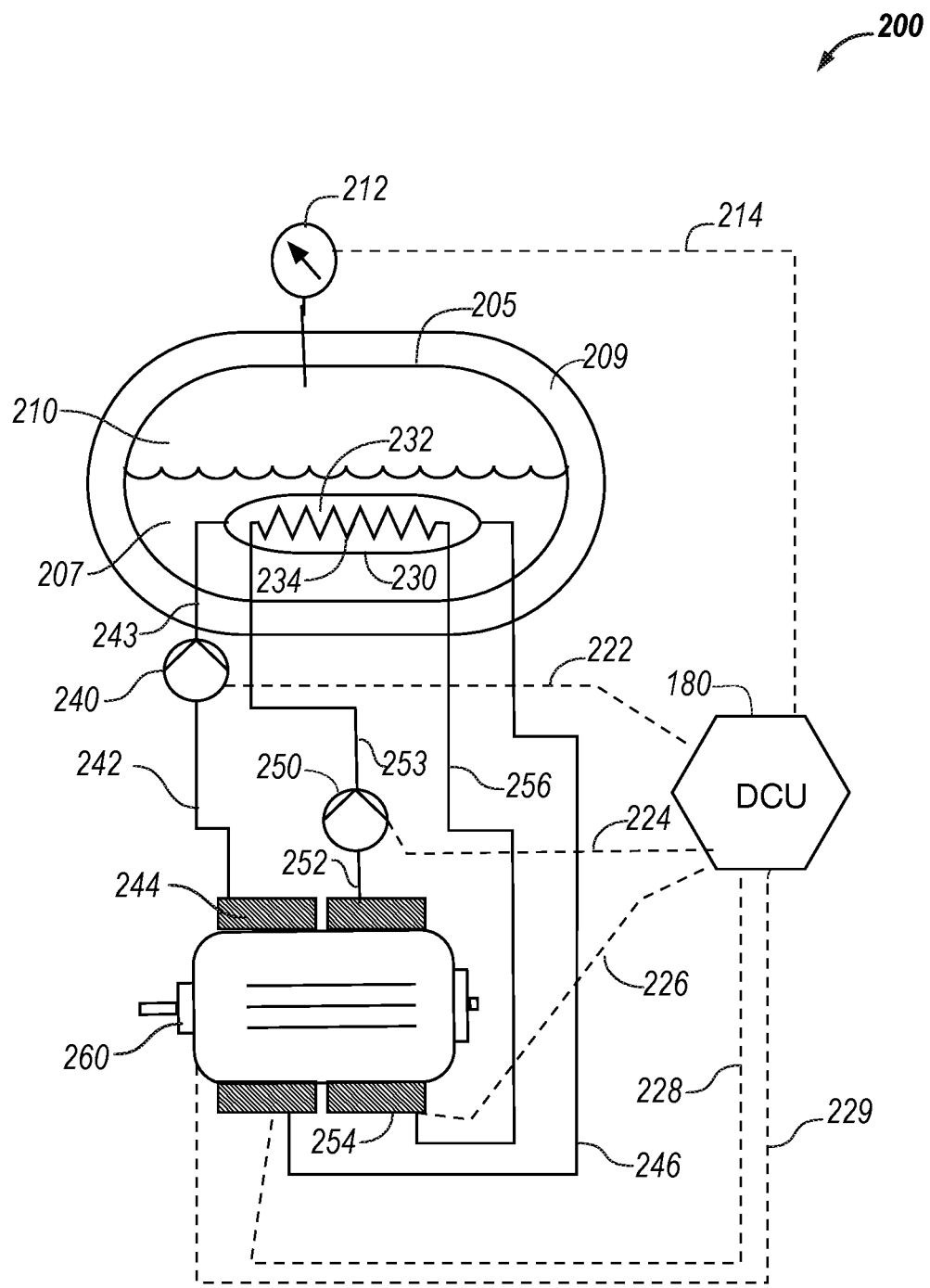
FIG. 2 discloses an embodiment of the motor cooling system further comprising a second cooling circuit.

Cooling System for a Hybrid Electric Vehicle (FIG. 2)

Cooling System with Feedback Loop:

In an embodiment 200, a fuel heat exchanger 230 is in thermal contact with a fuel 207 inside a fuel tank 205. A first motor cooling chamber 244 is in thermal contact with an electric motor 260. A heat transfer medium allows heat to flow from the first motor cooling chamber 244 to the fuel heat exchanger 230. This keeps the temperature of the electric motor 260 low and helps pre-heat the fuel 207.

The heat transfer medium can transfer heat through conduction, radiation or convection and can be a solid or a liquid.

In an embodiment, the heat transfer medium is a fluid that circulates naturally via convection between the fuel heat exchanger and the motor cooling chamber.

In an embodiment, the heat transfer medium is a solid of high thermal conductivity and transmits heat primarily via conduction.

In an embodiment the heat transfer medium is a coolant fluid of high specific heat circulating in a closed circuit from the motor cooling chamber 244 to the fuel heat exchanger 230 and back to the motor cooling chamber. The coolant fluid absorbs heat from the motor cooling chamber 244 and increases its temperature before circulating through the fuel heat exchanger 230 where heat is released from the coolant fluid to the colder fuel, lowering the temperature of the fluid.

A feedback loop is produced as motor temperature rises when power demand from the electric motor 260 increases. The higher temperature of the motor increases the flow of heat through the heat transfer medium into the fuel 207, increasing fuel evaporation and pressure inside fuel tank 205, whereby incremental fuel vapor is available to an engine of the hybrid vehicle and the engine can generate more power to supply the increased power demand from the electric motor 260.

Embodiment with First Cooling Circuit

In an embodiment the heat transfer medium comprises a first fluid coolant that circulates through a first cooling circuit. The first fluid coolant circulates through fuel heat exchanger 230 either through natural convection or forced by a coolant pump 240 wherein the throughput of the fluid coolant is controlled by the coolant pump 240.

A first coolant line 246 connects an outlet of the fuel heat exchanger 230 to an inlet of the first motor cooling chamber 244. A second coolant line 242 connects an outlet of the first motor cooling chamber 244 to an inlet of the coolant pump 240. An outlet of the coolant pump 240 connects to the fuel heat exchanger 230 through a third coolant line 243 completing the first cooling circuit.

When the electric motor 260 demands high levels of power and generates high levels of heat, the coolant pump 240 is run to increase the transfer of heat from the electric motor 260 into the fuel tank through the fuel heat exchanger 230. This in turn will allow for a higher fuel evaporation rate and an increase of pressure in the fuel tank 205, allowing for increased flow of liquid or vaporized fuel to an engine of the hybrid vehicle (not drawn in FIG. 2; corresponds to 170 in FIG. 1) through a fuel line (not drawn in FIG. 2; corresponding to 150 in FIG. 1). This increased fuel supply to the engine of the hybrid vehicle can subsequently produce more power and allow a generator of the hybrid vehicle to produce an increased amount of electric power to supply the higher power demand from the electric motor 260.

The feedback loop described above keeps the temperature of the motor windings from rising and increases the efficiency of the motor 260 by keeping the resistivity of the windings low and therefore R=I2 losses low. In an embodiment, the electric motor windings are made of aluminum or copper conductors that exhibit higher resistivity at higher temperatures.

Embodiment of Cooling System with First and Second Cooling Circuits

In an embodiment, the cooling system 200, shown on FIG. 2 further comprises a second cooling circuit. This configuration provides a dual coolant system with two parallel cooling circuits: the first cooling circuit uses a first fluid coolant with a melting point lower than ambient temperature while a second cooling circuit uses a second coolant with a melting point below the lowest expected temperature of the fuel tank 205 so that the second fluid coolant will never freeze. The second fluid coolant can then melt the first fluid coolant in the event the first fluid coolant freezes inside the fuel heat exchanger 230 when the electric motor 260 is idle for long periods and not producing enough heat to maintain the first fluid coolant in liquid phase.

The second cooling circuit can then operate when the vehicle is cold after a period of inactivity and circulate the second coolant fluid through a heat transfer coil 234 in thermal contact with the fuel heat exchanger 230.

This configuration has significant advantages when the fuel 207 is stored at low temperatures as is often the case with hydrogen, liquid methane or liquid ethane. At those temperatures most standard liquid coolants available in the market are likely to freeze, especially when the vehicle is idle and the electric motor is not generating heat.

The second cooling circuit draws motor heat and circulates the second fluid coolant through a heat transfer coil 234 in thermal contact with the fuel heat exchanger 230. The second fluid coolant melts any first fluid coolant that may remain frozen inside the fuel heat exchanger 230.

Once the motor is generating enough heat to maintain the first coolant in liquid state throughout the first cooling circuit, then the first cooling circuit can take over and use the more efficient heat transfer capabilities of the first fluid coolant for more effective cooling of the electric motor 260.

Turning off the compressor or fan 250 can shut off the second cooling circuit if desirable to save energy.

The embodiment disclosed on FIG. 2 comprises a first motor cooling chamber 244 containing a first fluid coolant in thermal contact with the electric motor 260. A second coolant line 242 takes the liquid coolant from the first motor cooling chamber 244 to a liquid coolant pump 240 that propels the fluid coolant into a third coolant line 243. The third coolant line 243 connects to the inlet of a fuel heat exchanger 230 inside the fuel tank 205, the fuel heat exchanger 230 comprising a hollow chamber 232 in thermal contact with the fuel 207. An outlet of the fuel heat exchanger 230 connects to a first coolant line 246 that then takes the first coolant fluid back to the first motor cooling chamber 244 completing the first cooling circuit.

In an embodiment, the first fluid coolant is selected from the group comprising ethylene glycol—water mixes, propylene glycol—water mixes, diethylene glycol, ethanol, ethane, water, demineralized water poly alpha olefins (PAO), and combinations thereof.

A second motor cooling chamber 254 contains a second fluid coolant at a predetermined pressure. An outlet of the second motor cooling chamber 254 is connected to an inlet of a compressor or fan 250 through a fifth coolant line 252. The compressor or fan provides forced circulation of the second coolant to enhance the transfer of heat. An outlet of the compressor or fan 250 connects to a sixth coolant line 253 that connects to an inlet to a heat transfer coil 234 within the fuel heat exchanger 230. An outlet of the heat transfer coil 234 connects to a fourth coolant line 256 that connects to an inlet of the second motor cooling chamber 254 completing the second cooling circuit.

In an embodiment, the second fluid coolant is selected from the group comprising hydrogen, helium, nitrogen, carbon dioxide, ethane, propane, sulfur hexafluoride, steam, and combinations thereof whereby the second fluid coolant has a melting point below the lowest temperature expected in the fuel tank. In an embodiment, the lowest temperature in the fuel tank is the boiling point of methane at atmospheric pressure or approximately −160 degrees Celsius.

Embodiment of Cooling System Further Comprising a Digital Control Unit

In an embodiment, a digital control unit DCU 180 controls the first and second cooling circuits of the dual coolant cooling system 200.

A pressure sensor 212 measures and monitors the pressure inside the fuel tank 205 and sends digital or analog signals corresponding to pressure through the pressure communication link 214 to the digital control unit 180.

A first temperature sensor in thermal contact with the first motor cooling chamber 244 (not drawn) measures and monitors the temperature inside the first motor cooling chamber 244 and sends digital or analog signals corresponding to temperature to the digital control unit 180 through a first temperature communication link 228.

A second temperature sensor inside the second cooling chamber 254 (not drawn) measures and monitors the temperature inside the second cooling chamber and sends digital or analog signals corresponding to temperature to the digital control unit 180 through a second temperature communication link 226.

A motor temperature sensor in thermal contact with an electric motor 260 (not drawn) measures and monitors the temperature inside the electric motor and sends digital or analog signals corresponding to temperature to the digital control unit 180 through a motor temperature communication link 229.

The coolant pump 240 and compressor or fan 250 is connected to the digital control unit DCU through a pump communication link 222 and a compressor communication link 224 respectively. The DCU 180 can send digital or analog signals through communication links 222 and 224 to control the coolant pump 240 and compressor 250 respectively.

Figure 3:
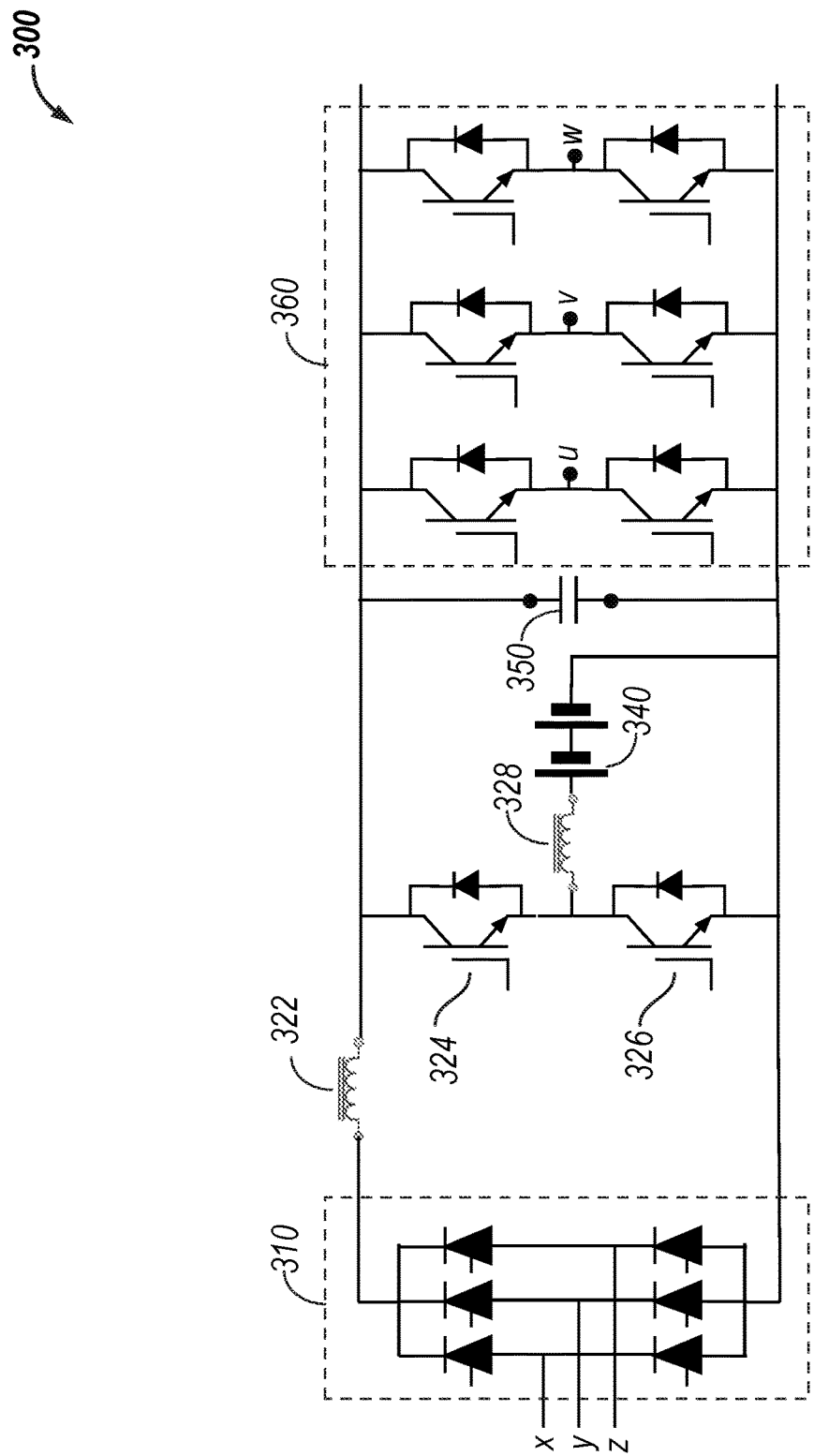
FIG. 3 illustrates an embodiment of the power electronics controller PEC 142 of FIG. 1.

FIG. 3: Example Embodiment of the Power Electronics Converter

In an embodiment, (FIG. 3) the power electronics converter 300 comprises a controlled rectifier 310 that converts alternating power from the generator 190 into direct current In an embodiment, the controlled rectifier 310 is comprised of semiconductors selected from the group of thyristors, diodes, transistors, field effect transistors, isolated gate bipolar transistors, silicon carbide transistors and combinations thereof.

Power from the generator 190 flows through the first power line 192 and enters the rectifier 310 through input terminals x, y, z corresponding to the three phases of generator 190. In this embodiment, the generator is a three phase synchronous generator. Other embodiments could comprise a higher number of phases.

First inductor 322 limits the current produced by the rectifier and increases current stability by reducing current ripple. A capacitor 350 connected to the first inductor 322 provides a firm voltage link to an inverter 360 electrically connected to the second power line 122 at output terminals u, v, and w. The second power line 122 comprises a plurality of conductors and connects the output terminals of the inverter 360 to the electric motor 120.

In an embodiment the motor is a three-phase motor and the inverter connects to the motor at point's u, v and w corresponding to each of the three phases of the electric motor 120.

Other embodiments can include a higher number of phases and the inverter would have an output point for each phase, each output point being the mid point of a bridge comprised by two series connected electronic switches in a similar arrangement as the one illustrated on FIG. 3 as known in the art.

The inverter 360 converts the direct current from the capacitor 350 and rectifier 310 into alternating current suitable to power a multi phase AC electric motor 120.

In an embodiment, the inverter 360 uses pulse with modulation (PWM) to reduce current and voltage harmonics.

In an embodiment, an electric energy storage 340 comprises a battery selected from the group comprising lithium batteries, lithium phosphate batteries, nickel cadmium batteries, lead acid batteries, and nickel metal hydride batteries, ultra-capacitors, lithium capacitors and combinations thereof.

In an embodiment, the energy storage unit 340 comprises a super capacitor or ultra capacitor allowing for increased energy recovery from regenerative braking.

In an embodiment, the electric energy storage 340 comprises a battery management system that regulates the charge and discharge of the battery such that the battery life is maximized and its temperature is maintained within predetermined safety limits.

A first electronic switch 324 and second electronic switch 326 along with a second inductance 328 comprise a step-up/step-down circuit that allows to charge and discharge the energy storage unit 340 in a controlled way as known in the art.

In an embodiment, the electronic switches 324 and 326 are semiconductor switches selected from the group comprising bipolar transistors, field effect transistors, insulated gate bipolar transistors, silicon carbide transistors and combinations thereof.

In an embodiment, the inverter 360 is comprised of three or more bridges of semiconductor switches selected from the group of bipolar transistors, field effect transistors, insulated gate bipolar transistors silicon carbide transistors and combinations thereof as known in the art.

Charging of Electric Energy Storage:

When switch 324 is turned on, current flows from the rectifier into the electric energy storage through inductors 322 and 328 and charges the energy storage. As in regular step-down circuits, the current level is controlled by turning switch 324 on and off at a suitable frequency and varying the ratio of on time to off time as known in the art. When switch 324 is off, current continues to flow through the energy storage 340 and inductor 328 through the anti parallel diode of switch 326 and decreases linearly at a rate determined by the voltage of the electric energy storage and inductor 328.

When using power from the energy storage 340 to power the inverter 360, switches 324 and 326 can be operated in step-up mode. Switch 326 will be turned on so that current out of the energy storage 340 and through inductor 328 can flow through switch 326 and increase linearly at a rate determined by the energy storage unit voltage and inductor 328. Once a predetermined current level is reached, switch 326 is turned off and current flows through the antiparallel diode of 324 towards the inverter. The current out of the energy storage now decreases linearly at a rate determined by the voltage difference between the capacitor 350 and the energy storage unit 340, and by the inductor 328.

Auxiliary circuits required like trigger circuits, control circuits, protection circuits and power supply as known in the art are not drawn on FIG. 3.

FIG. 4. Air to Fuel Ratio Controller

In an embodiment 400, the AFRC 160 further comprises a fuel supply controller 420 that can deliver predetermined amounts of fuel to a fuel injector 410 or a plurality of fuel injectors connected to the inlet manifold 168 of the engine 170.

For simplicity, only one fuel injector is illustrated in FIG. 4 although embodiments with multiple injectors are contemplated.

In an embodiment, a fuel injector 410 is connected to the digital control unit (DCU) 180 through a fuel injector communication link (represented in FIG. 4 as a dotted line).

In an embodiment, the intake manifold comprises a plenum and a plurality of runners connected to the plenum wherein the plenum is connected to an air inlet of the AFRC. A plurality of fuel injectors, each fuel injector connected to one of the runners, allows the delivery of controlled amounts of fuel into each runner.

In an embodiment, the fuel injectors deliver a vapor fuel into their respective runners.

In an embodiment an air throttle valve 430 adjusts the amount of intake air into the intake manifold 168 and cylinder combustion chambers 408.

A throttle valve actuator (not drawn) is provided for opening and closing the air throttle valve and connected to the DCU 180 by means of an air throttle communications link so that the throttle valve 430 can be controlled by the DCU 180.

An air filter 460 prevents particulate matter from entering the AFRC through the air inlet 162.

In an embodiment, the throttle valve 430 is a butterfly valve disposed downstream of the air filter 460.

In an embodiment, an air flow meter 440 is located downstream of the throttle valve 430 to enable the measurement of airflow through the throttle valve. In an embodiment the air flow meter 440 has an airflow communication link to the digital control unit DCU 180 (represented by a dotted line in FIG. 4).

In an embodiment the outlet of the throttle valve is connected to the intake manifold 168.

In an embodiment, the intake manifold comprises a plenum and multiple runners wherein each runner is connected to a fuel injector and the outlet of each runner is connected to an intake port of the engine. Such arrangement allows the fuel injectors to precisely control the fuel amount entering each of the runners and each of the intake ports. Each intake port leads to an intake valve 404 that controls the flow of air and fuel into a combustion chamber 408 of the engine.

In an embodiment, an exhaust sensor 167, located on an exhaust 166 of the engine 179, comprises an oxygen sensor and enables a closed loop control system of the air to fuel ratio by detecting the amount of oxygen remaining in the exhaust gas along with indicators of incomplete combustion like carbon monoxide from an internal combustion engine.

In an embodiment, the exhaust sensor is connected to the digital control unit 180 (DCU) through an exhaust communication link.

In the event the exhaust sensor 167 indicates that the air fuel mix may be too rich or too lean, the digital control unit 180 can adjust the parameters of the AFRC through a communication link 164 to increase or decrease the amount of air entering the intake manifold 168 through the air inlet 162.

The air inlet 162 can be naturally aspirated or turbocharged. A turbocharger (not drawn can be located upstream of the air inlet to increase the amount of air flowing through the air inlet 162 into the intake manifold 168.

In an embodiment, the fuel supply controller 420 is connected to the DCU 180 through a fuel supply communication link, represented by a dotted line in FIG. 4, that enables the fuel supply controller 420 to be controlled by the DCU 180.

Embodiment for Heavy-Duty Vehicle (FIG. 5A and FIG. 5B)

In an embodiment, 500 (FIG. 5A and FIG. 5B) the hybrid vehicle comprises a heavy-duty vehicle such as class 8 tandem axle truck.

In another embodiment, (not drawn) the hybrid vehicle comprises a medium duty or heavy-duty vehicle with a single real axle.

FIG. 5A illustrates an embodiment by showing a lateral cross section of a tandem axle vehicle while FIG. 5B represents the same vehicle configuration viewed from above.

The drawings in FIG. 5A and FIG. 5.B are not in proportion and represent the various parts in a schematic way so that the linkages can be described. The actual relative sizes and proportions of various components could be very different from those on the drawings.

The engine 170 is mechanically coupled to generator 190 through a generator shaft 191.

In an embodiment, the generator shaft 191 is accessible from both the front and back of the generator so that a first end of the generator shaft 191 is coupled to the engine and a second end of the generator shaft 191 can be coupled to other elements of the propulsion system.

A first mechanical link 518 is connected to an engine shaft and can transfer torque and power to a first motor shaft 519 of a first electric motor 120a Therefore rotational energy from the engine 170 can be transferred to the motor shaft 519.

In an embodiment, the mechanical coupling 172 comprises a torque converter 512 mechanically connected to an engine shaft. The torque converter is connected to a first clutch (not drawn) and the output of the first clutch is connected to a mechanical link 518. The mechanical link 518 is connected to a first electric motor shaft 519. When the first clutch is engaged torque can be transmitted from the engine shaft through the torque converter, first clutch and mechanical link to the first electric motor shaft 519.

The configuration described allows power to be transferred mechanically from the engine 170 to the motor 120a through the mechanical link 518 when the clutch is engaged. The motor 120a and the engine 170 can rotate independently when the first clutch is disengaged.

This configuration allows for the direct transfer of power from the engine to the wheels when such transfer is convenient as motor 120a is mechanically connected to the wheels. This can occur while cruising at a stable speed when the engine can be maintained at a high efficiency point while transferring power directly to the wheels without need for the electric motors to provide incremental power.

In an embodiment, the first motor 120a is mechanically connected to a second motor 120b comprising a second motor shaft so that both motors can provide power to a driveshaft 530. This mechanical connection is represented as shaft 520 but could comprise a variety of mechanical couplings including flexible couplers, chain couplings, timing belts and v-belts.

In an embodiment a second mechanical coupling, (not drawn) can connect the engine 170 to the motor 120a with a higher gearing ratio. This second mechanical coupling can comprise a second clutch and a second mechanical link connected to the first motor shaft 519.

The second clutch is controlled independently from the first clutch so that the first and second clutch are never engaged simultaneously. This configuration can be useful when high torque is required to move the vehicle from a standstill allowing for the engine 170 to provide power to the driveshaft through the second mechanical coupling with a high gearing ratio. This configuration requires less starting torque from the electric motors and therefore allows for smaller electric motors and reduces the current requirements for the electronic switches comprising the power electronics converter 142.

In an embodiment the first mechanical coupling 172 comprises a clutch sprocket 514 connected to the output of the torque converter and clutch assembly 512. A roller chain connects the clutch sprocket 514 to a motor sprocket 516 so that power and torque can be transmitted from clutch sprocket 514 to the motor sprocket 516 and vice-versa through the roller chain.

The motor sprocket 516 is attached to a first end of the motor shaft 519. Electric motors 120A and 120B are configured with pass-through motor shafts so that both ends of the motor shafts are accessible from outside the motor and can be mechanically coupled to other moving parts.

A second end of the motor shaft 519 is coupled to a first end of a second motor shaft 520 by means of a flexible coupling. A second end of the second motor shaft 520 is coupled to a driveshaft 530 through a first universal joint.

The driveshaft 530 is coupled to a differential 534 through a second universal joint (not drawn).

When the clutch of the torque converter and clutch assembly 512 is disengaged, there is no mechanical coupling between the engine 170 and generator shaft 191 with electric motors 120A and 120B. Therefore the hybrid vehicle operates as a series hybrid with only motors 120A and 120B driving the driveshaft 530 using electric power from generator 190 and a battery of the hybrid vehicle.

When the clutch of the torque converter and clutch assembly 512 is engaged, then power and torque can flow from the engine 170 to the driveshaft 530 through the generator shaft 191, torque converter and clutch assembly 512, clutch sprocket 514, roller chain 518, motor sprocket 516 and electric motor shafts 519 and 520. In this configuration, the hybrid vehicle operates as a parallel hybrid with the driveshaft 530 receiving power and torque from the engine 170, first electric motor 120A and second electric motor 120B.

The diameter and teeth number ratios between clutch sprockets 514 and motor sprockets 516 can be of any value suitable to the specific application.

In an embodiment, clutch sprockets 514 and motor sprockets 516 are identical so that first motor shaft 519 rotates at the same rpm as generator shaft 191 when there is no slip in the torque converter of 512.

In an embodiment, clutch sprockets 514 and motor sprockets 516 are of different sizes such that generator shaft 191 rotates at higher speed than that of first motor shaft 519 when there is no slip in the torque converter of 512.

In an embodiment, clutch sprocket 514 comprises a plurality of sprockets; and motor sprocket 516 comprises and equal number of sprockets. An equal number of parallel roller chains 512 connect each of the clutch sprockets in 514 to the respective motor sprockets in 516. This configuration allows for spreading of the load across a plurality of sprockets and roller chains allowing for higher torque transmission and better durability.

In an embodiment, the first mechanical link 518 comprises V-belts and sheaves or a CVT belt and conical sheaves or pulleys as known in the art to obtain a continuously variable gearing ratio.

In an embodiment, the torque converter and clutch assembly 512 does not have a torque converter and only includes a clutch and respective couplings.

In an embodiment, driveshaft 530 is attached to a tandem axle as depicted in FIG. 5A and FIG. 5B. The tandem axle propels front axle wheels 560 and rear axle wheels 570 by means of rear differential 550, power divider and front differential assembly 534 and propeller driveshaft 540.

In an embodiment (not drawn), driveshaft 530 is attached to a single axle.

In an embodiment, the mechanical link 518 comprises a transmission shaft. In another embodiment, the mechanical link 518 comprises v-belts and pulleys.

Advantages

The configuration described in the embodiment of FIG. 5 allows for:
- lower center of gravity and higher stability as the electric motors concentrate weight towards the center of the truck;
- flexibility to operate vehicle as a series hybrid with propulsion fully provided by the electric motors and without any mechanical link between the engine and the wheels;
- Increased efficiency during highway cruising by allowing the ICE to transmit power directly to the wheels through the mechanical coupling 172.
- Mechanical link 518 (e.g. roller chain transmission or CVT) is mostly used during cruising and therefore not subjected to aggressive wear and tear.
- The sprocket ratio of a roller chain transmission can be adjusted for maximum efficiency depending on the demands of the vehicle and torque/power/rpm characteristics of a variety of engine models, generators, motors and axle differentials available in the market;
- The electric motors and driveshaft can be aligned on a straight line without requiring any bending of the driveshaft or universal joints for improved efficiency;
- The mechanical link between the electric motors and the engine does not require an angled shaft that would result in efficiency losses.

REFERENCE NUMERALS

FIG. 1: Flexible Fuel Hybrid Electric Vehicle

110 Fuel tank
112 fuel vapor space
118 fuel
116 thermal insulation
120 electric motor
122 second power line
170 engine
178 motor driveshaft
172 mechanical coupling
130 fuel heat exchanger
132 first coolant line
134 first motor cooling chamber
136 PEC coolant line
138 electronic module cooling chamber
139 second coolant line
140 coolant pump
150 first fuel line
152 solenoid valve
154 pressure regulator
162 air inlet
160 air to fuel ratio controller
161 second fuel line
168 intake manifold (to engine)
166 exhaust
167 exhaust sensor
190 generator
192 first power line
142 power electronics converter (PEC)
180 digital control unit
182 first communication link (pressure sensor)
184 solenoid valve control communication link
186 second communication link (pressure regulator)
164 third communication link (AFRC)
188 fourth communication link (exhaust sensor)
176 fifth communication link (engine)
174 mechanical coupling communication link
194 sixth communication link (generator)
146 seventh communication link (PEC)
124 motor control communication link
144 eighth communication link (coolant pump)

FIG. 2: Embodiment with Two Cooling Circuits 212 pressure sensor
205 vessel
209 thermal insulation
210 vapor space
207 liquid fuel
230 fuel heat exchanger
232 hollow chamber
234 heat transfer coil
240 coolant pump
243 third coolant line
246 first coolant line
244 first motor cooling chamber
242 second coolant line
250 compressor
252 fifth coolant line
253 sixth coolant line
256 fourth coolant line
254 second motor cooling chamber
220 digital control unit
214-pressure sensor communication link
222-pump communication link
224-compressor communication link
226-second temperature communication link
228 first temperature communication link
229 motor temperature communication link
260 electric motor FIG. 3: Power Electronics Converter 310 controlled rectifier
322 first inductance
324 first semiconductor switch
326 second semiconductor switch
328 second inductance
340 battery 350 capacitor
360 inverter FIG. 4: Air to Fuel Ratio Controller 162 air inlet
166 exhaust
167 exhaust sensor
168 intake manifold
402 exhaust valve
404 intake valve
406 piston head
408 combustion chamber
410 fuel injector
420 fuel supply controller
430 air throttle valve
440 air flow meter
460 air filter FIG. 5: Embodiment for Heavy-Duty Vehicle 170 Engine
120a first electric motor
120b second electric motor
191 generator shaft
172 mechanical coupling
502 front wheel
512 torque converter with clutch
514 clutch sprockets
516 motor sprockets
518 mechanical link
519 first motor shaft
520 second motor shaft
530 driveshaft
534 power divider and front differential
540 propeller shaft
550 rear differential
560 front axle wheel
570 rear axle wheel Operation Power available from the engine 170 is converted into electricity by a generator 190 (G) and transferred to an electric motor 120 by a power electronics converter 142 configured to adjust the electric motor's power and torque to the driving conditions of the vehicle. The electric motor's rotor is coupled to the vehicle's drivetrain (not drawn) and provides propulsion to the drivetrain of the hybrid vehicle as required by the vehicle.

In an embodiment, the power electronics converter 142 comprises a battery (not drawn) that allows the generator 190 and electric motor 120 to be run independently and can be configured to allow the vehicle to run purely on electricity from the battery, without running the engine 170, for a predetermined range.

In an embodiment, a mechanical coupling 172 controlled by the digital control unit 180 can be configured to mechanically transfer incremental power and torque from the engine 170 to the electric motor's rotor through a motor driveshaft 178. This coupling 172 can be engaged to increase vehicle efficiency under certain driving circumstances like highway cruising.

In an embodiment, the electric motor 120 and power electronics converter (PEC) 142 can be cooled by a heat transfer fluid circuit that removes heat from the electric motor 120 and vehicle electronics and transfers heat to the fuel 118 inside the vehicle's fuel tank 110 by means of a fuel heat exchanger 130 in thermal contact with the fuel tank 110.

Normal Operation

Under normal operation, the electric motor 120 provides power and torque to the vehicle's drivetrain (not drawn) as required by the vehicle's driving conditions and as required by the vehicle's operator (driver).

The power electronics converter (PEC) 142 provides electric energy for the electric motor 120. In an embodiment, the PEC 142 comprises an electric storage unit (e.g. selected from the group comprising batteries and capacitors and combinations thereof) that provides energy for the electric motor 120.

In an embodiment, the PEC 142 comprises an inverter that converts direct current from the electric storage unit into alternating current of variable frequency suitable for an alternating current (AC) motor.

The battery is recharged with energy form the generator 190 flowing into the PEC 142 through the first power line 192. In an embodiment, the PEC contains electronic circuits configured to maintain the battery charged within a certain predetermined percentage of charge range. In an embodiment, the PEC maintains the battery charged between 20% and 80% of total capacity.

The generator 190 is powered by an engine 170 operated at a speed consistent with the speed required by the generator 190 for high efficiency.

In an embodiment, the engine (ICE) 170 is configured to run between 2500 and 3600 rpm and is mechanically connected directly to the generator shaft 191 so that the generator 190 rotates at the same speed of the engine 170.

In another embodiment, the mechanical connection between the generator shaft 191 and the engine 170 may include a transmission, transaxle, torque converter or other mechanical devices comprising gears or chain drives such that the generator 190 and engine 170 can rotate at different speeds for higher efficiency, allowing generator 190 and engine 170 to operate closer to their respective optimal speeds.

The generator 190 and engine 170 are sized to provide enough power to maintain the battery adequately charged through a wide range of predetermined driving conditions.

In an embodiment, the engine 170 is configured to run on fuel comprising hydrogen and or a blend of hydrocarbons selected from the group of methane, propane, ethane, butanes, heavier hydrocarbons (e.g. C5+) and mixtures thereof.

In an embodiment, the air to fuel ratio controller (AFRC) 160 is configured to adjust the ratio of air to fuel so that the engine 170 runs efficiently within the predetermined speed range and the fuel combustion is complete (lean air fuel mix or stoichiometric air fuel mix). As the chemical composition of the fuel can vary, the AFRC adjusts the amount of air that flows into the air inlet 162 accordingly.

In an embodiment, the vehicle runs on a mix of methane, ethane, propane and butane. As methane has the lowest boiling point it tends to evaporate first so shortly after the vehicle is refueled, the vapor flowing into the engine 170 will have a high proportion of methane requiring an air to fuel ratio close to 10:1 as required for full combustion of methane (table 1). As methane is depleted and the fuel vapor mix flowing into the engine 170 becomes richer in propane, the air fuel mix from the AFRC is adjusted (e.g. by the DCU 180) towards a ratio closer to 25:1 as required for full combustion of propane. As propane is depleted and the fuel vapor becomes richer in butane, the AFRC 160 will continue to shift toward a ratio of 32:1 as required for full combustion of butane. This approach can be extended to accommodate heavier hydrocarbons such as pentanes, naphtha, distillates etc.

In an embodiment, the AFRC 160, as controlled by the digital control unit (DCU) 180, can act on other parameters of the engine 170 to adjust for the varying octane index of the fuel mix. In an embodiment, the engine 170 is a spark plug reciprocating engine and the AFRC 160 is configured to adjust the ignition timing for optimal performance as fuel quality changes.

In an embodiment, a cooling fluid or coolant circulates in thermal contact with the electric motor 120 and PEC 142 to remove excess heat and transfer it to the fuel 118 inside the fuel tank 110.

This heat transfer increases the evaporation rate of the fuel. The fuel heat exchanger 130 and cooling fluid circulation are configured to provide enough evaporation inside the fuel tank 110 to provide for the fuel needs of the engine 170.

In an embodiment, the fuel tank 110 is covered by thermal insulation 116 that prevents ambient heat from leaking into the fuel tank 110 and producing undesired evaporation.

High Load Operation (e.g. Acceleration. Climbing a Steep Slope, Towing a Heavy Load)

Under high loads, the electric motor 120 will draw the incremental power requirements mainly from the battery. The engine 170 will continue to operate within the parameters of rpm and air fuel mix that are most efficient for the composition of the fuel being used.

The engine 170 will be accelerated to produce more power and consume more fuel only if the battery is discharged below a predetermined level, or if the fuel pressure inside the fuel tank 110 increases above a predetermined level.

A pressure sensor 156 monitors and measures fuel pressure inside the fuel tank 110. If vapor pressure drops below the level required to provide sufficient fuel for the efficient operation of the ICE engine 170, the DCU 180 will shut off the engine 170 until pressure in the fuel tank 110 recovers.

Low Load Operation (e.g. Vehicle Idle or Parked)

In an embodiment, under low load operation, the power from the generator 190 will allow for recharging of the battery. If the battery reaches a predetermined upper level of charge, then the engine (ICE) 170 can be shut off to avoid overcharging the battery.

The engine (ICE) 170 will be restarted again when power demand from the electric motor 120 increases, provided there is enough pressure inside the fuel tank 110, as measured by the pressure sensor 156 to provide enough fuel vapor to the engine (ICE) 170 effectively.

In an embodiment, if pressure in the tank 110 becomes excessive, the ICE 170 can be run so that the generator 190 can charge a battery 340 through the power electronics controller (142 in FIGS. 1 and 300 in FIG. 3) so that venting of fuel into the atmosphere through a pressure relief valve is avoided or minimized.

If the battery is already fully charged, then the engine (ICE) 170 can be run at a low power to consume excess vapor fuel from the fuel vapor space 112 and reduce the pressure in the tank 110 without generating substantial power from the generator 190. This low rpm mode is not highly efficient and therefore the fuel tank size, insulation 116 and fuel vapor space 112 are configured such that this scenario does not occur frequently under normal driving conditions.

The invention claimed is:

1. A hybrid electric vehicle comprising:
  b. a fuel tank;
  c. a fuel wherein the fuel is in fluid state and stored inside the fuel tank;
  d. a fuel vapor space inside the fuel tank containing a fuel vapor;
  e. a fuel path connected to the fuel tank whereby the fuel can flow through the fuel path;
  f. an energy conversion engine connected to the fuel path wherein the fuel can flow into the energy conversion engine whereby the energy conversion engine extracts chemical energy from the fuel and produces electricity to power the hybrid electric vehicle;
  g. a fuel heat exchanger in thermal contact with the fuel wherein a first coolant fluid can flow through the fuel heat exchanger and transfer heat to the fuel;
  h. a first motor cooling chamber in thermal contact with an electric motor wherein the first coolant fluid can flow through the first motor cooling chamber and remove heat from the electric motor;
  i. a first cooling circuit, connected to the fuel heat exchanger and the first motor cooling chamber, comprising a coolant pump, wherein the first coolant fluid circulates through the cooling circuit, whereby the coolant pump controls the throughput of the first coolant fluid through the first cooling circuit, to regulate a flow of heat between the electric motor and the fuel, and maintain the pressure in the fuel tank within a predetermined range;
  j. a feedback loop that increases the heat transferred from the electric motor to the fuel when the electric motor demands higher levels of power and generates higher levels of heat, whereby fuel preheating increases, and the throughput of preheated fuel available to the energy conversion engine increases as power demand from the electric motor increases.

2. The hybrid electric vehicle of claim 1 wherein the energy conversion engine comprises:
  b. an internal combustion engine selected from the group consisting of reciprocating engines, Otto cycle engines, Wankel engines, Atkinson engines, gas turbines, and Stirling engines;
  c. a generator, mechanically connected to the internal combustion engine, wherein kinetic energy from the internal combustion engine is transmitted to the generator whereby the generator can generate electric energy.

3. The hybrid electric vehicle of claim 2 further comprising:
  a. a power electronics converter comprising a plurality of input terminals, wherein the input terminals are electrically connected to the generator through a first power line;
  b. a second power line comprising a plurality of conductors connecting the power electronics converter to the electric motor, wherein the power electronics converter draws power from the first power line and applies a predetermined pattern of currents and voltages to the electric motor through the second power line and controls the electric motor.

4. The hybrid electric vehicle of claim 1, further comprising one or multiple layers of thermal insulation surrounding the fuel tank, wherein the fuel is stored at a temperature below ambient temperature.

5. The hybrid electric vehicle of claim 1, wherein the fuel is liquefied natural gas at a temperature below 150 degrees Celsius.

6. The hybrid electric vehicle of claim 1 wherein the first cooling circuit comprises:
   a. a first coolant line wherein a first end of the first coolant line connects to an outlet of the fuel heat exchanger, and a second end of the first coolant line connects to an inlet of the first motor cooling chamber;
   b. a second coolant line wherein a first end of the second coolant line is connected to an outlet of the first motor cooling chamber, and a second end of the second coolant line is connected to an inlet of the coolant pump, whereby the coolant pump can control the throughput of the first coolant fluid through the first cooling circuit;
   c. a third coolant line, wherein a first end of the third coolant line is connected to an outlet of the coolant pump, and a second end of the third coolant line is connected to an inlet of the fuel heat exchanger, whereby the first coolant fluid can flow from the fuel heat exchanger to the first motor cooling chamber and back to the fuel heat exchanger to achieve a predetermined heat flow controlled by the coolant pump.

7. The hybrid electric vehicle of claim 6 further comprising a second cooling circuit, the second cooling circuit comprising:
   a. a heat transfer coil in thermal contact with the fuel heat exchanger;
   b. a second coolant fluid flowing through the heat transfer coil wherein the second coolant fluid can transfer heat to the first coolant fluid inside the fuel heat exchanger;
   c. a second motor cooling chamber in thermal contact with the electric motor;
   d. a compressor wherein-the compressor is connected to the second motor cooling chamber and the heat transfer coil, whereby the compressor can control the throughput of the second coolant fluid through the second cooling circuit and the second coolant fluid can transfer heat to the first coolant fluid.

8. The hybrid electric vehicle of claim 3 wherein the power electronics converter further comprises:
   a. a rectifier connected to the first power line wherein alternating current from the generator is converted to direct current;
   b. a first inductance connected in series with the rectifier wherein the first inductance can smooth the current from the rectifier and reduce the current ripple;
   c. a first electronic switch comprising an input connected to an output terminal of the first inductance;
   d. a second electronic switch wherein an input of the second electronic switch is connected to an output of the first electronic switch and an output of the second electronic switch is connected to a negative terminal of the rectifier;
   e. a second inductance with a first terminal wherein the first terminal of the second inductance is connected to the output of the first electronic switch;
   f. an electric energy storage wherein a first terminal of the electric energy storage is connected to a second terminal of the second inductance and a second terminal of the electric energy storage is connected to the negative terminal of the rectifier;
   g. a capacitor with a first terminal connected to the output terminal of the first inductance and a second terminal connected to the negative terminal of the rectifier;
   h. an inverter comprising two input terminals and a plurality of output terminals wherein a first input terminal is connected to the first terminal of the capacitor and a second input terminal is connected to the second terminal of the capacitor whereby the inverter converts direct current from the capacitor into alternating currents at the output terminals wherein the output terminals are connected to the second power line.

9. The hybrid electric vehicle of claim 1 comprising an air fuel ratio controller connected to the energy conversion engine, wherein the air fuel ratio controller comprises a fuel inlet, and an air inlet wherein the fuel inlet is connected to the fuel path, whereby the air to fuel ratio controller can adjust the mass flows of fuel and oxygen into the energy conversion engine.

10. The hybrid electric vehicle of claim 2 comprising:
    a. a mechanical coupling connected to the internal combustion engine;
    b. a motor driveshaft with a first end connected to the mechanical coupling and a second end connected to the electric motor, whereby incremental power and torque from the internal combustion engine can be mechanically transmitted to the electric motor through the motor driveshaft.

11. The hybrid electric vehicle of claim 10 further comprising:
    a. a torque converter coupled to an internal combustion engine shaft;
    b. a first clutch connected to the torque converter;
    c. a first mechanical link connected to the first clutch;
    d. a first motor shaft connected to the first mechanical link whereby when the first clutch is engaged, torque can be transmitted from the torque converter to the first motor shaft through the clutch and first mechanical link;
    e. a flexible coupling mechanically connecting the first motor shaft to a second motor shaft;
    f. a first universal joint mechanically connecting the second motor shaft to a differential driveshaft;
    g. a second universal joint connecting the driveshaft to a differential of the hybrid electric vehicle.

12. The hybrid electric vehicle of claim 9 further comprising: a first digital control unit connected to the air fuel ratio controller, the digital control unit further comprising:
    a. an electronic data storage medium;
    b. machine instructions loaded on the electronic data storage medium;
    c. a processor connected to the electronic data storage medium whereby the processor can execute the machine instructions;
    d. an input output system connected to the processor wherein the digital control unit can exchange communication signals with external devices;
    whereby the digital control unit can adjust the flows of air and fuel entering the energy conversion engine as the chemical composition of the fuel varies.

13. The hybrid vehicle of claim 1 wherein the fuel comprises a blend of light hydrocarbons selected from the group consisting of methane, ethane, propane, butanes, and pentanes.

14. The hybrid electric vehicle of claim 9 wherein the air fuel ratio controller is configured to adjust the air to fuel ratio to a ratio selected from the group comprising:
    a. an air to fuel ratio of approximately 10 to 1 in volume when the composition of fuel comprises predominantly methane, as required for complete oxidation of methane;

b. an air to fuel ratio of approximately 25 to 1 in volume when the composition of the fuel comprises primarily propane, as required for complete oxidation of propane;

c. an air to fuel ratio of approximately 32 to 1 in volume when the composition of the fuel comprises primarily butane, as required for complete oxidation of butane.

15. The hybrid electric vehicle of claim 11 further comprising:

a. A second clutch mechanically connected to the torque converter;

b. a second mechanical link connected to the output of the second clutch and coupled to the first motor shaft, the second mechanical link further comprising a gear reduction, whereby when the second clutch is engaged and the first clutch is disengaged, torque can be transmitted from the internal combustion engine to the first electric motor shaft allowing the rotational speed of the internal combustion engine to be higher than the rotational speed of the first motor shaft.

16. The hybrid electric vehicle of claim 1 further comprising:

a. a pressure sensor connected to the fuel tank whereby the pressure sensor measures the pressure of the fuel inside the fuel tank;

b. a second digital control unit connected to the pressure sensor through a first communication link whereby the pressure sensor sends digital or analog signals to the digital control unit corresponding to pressure, the digital control unit further comprising:
  i. a plurality of computer readable media;
  ii. a plurality of machine instructions loaded on the computer readable media;
  iii. a processor connected to the computer readable media whereby the processor can execute the machine instructions;
  iv. an input output system connected to the processor wherein the digital control unit can exchange communication signals with external devices;

c. a second communication link connecting the digital control unit to the energy conversion engine, wherein the digital control unit can control the operation of the energy conversion engine;

d. third communication link connecting the digital control unit to the coolant pump wherein the digital control unit can control the coolant pump and the rate of heat transfer from the electric motor to the fuel, whereby fuel evaporation can be controlled, and a predetermined pressure range in the fuel tank can be maintained.

17. The hybrid electric vehicle of claim 7 further comprising:

a. a first temperature sensor in thermal contact with the first motor cooling chamber;

b. a second temperature sensor in thermal contact with the second motor cooling chamber;

c. a motor temperature sensor in thermal contact with the electric motor;

d. a second pressure sensor connected to the fuel tank;

e. third digital control unit, connected to the second pressure sensor through a pressure communication link, wherein the second pressure sensor transmits pressure information electronically to the third digital control unit through the pressure communication link;

f. a pump communication link, wherein the third digital control unit sends pump control signals to the coolant pump through the pump communication link;

g. a compressor communication link, wherein the digital control unit sends compressor control signals to the compressor;

h. a first temperature communication link, wherein the third digital control unit receives first temperature electronic signals from the first temperature sensor;

i. a second temperature communication link, wherein the third digital control unit receives second temperature electronic signals from the second temperature sensor;

j. a motor temperature communication, link wherein the third digital control unit receives motor temperature electronic signals from the motor temperature sensor;

k. machine instructions stored in the third digital control unit, whereby the third digital control unit can process the pressure information, the first temperature electronic signals, the second temperature electronic signals, and the motor temperature electronic signals, and produce the compressor control signals and the pump control signals to control the throughput of the first coolant fluid, the throughput of the second coolant fluid, and the pressure of the fuel tank to control the temperature of the electric motor, and the pressure in the fuel tank according to predetermined control strategies.

* * * * *